United States Patent [19]

Puster et al.

[11] Patent Number: 5,665,916

[45] Date of Patent: Sep. 9, 1997

[54] FUEL LINE BASED ACOUSTIC FLAME-OUT DETECTION SYSTEM

[75] Inventors: Richard L. Puster, Hampton; John M. Franke, Yorktown, both of Va.

[73] Assignee: The United States of America as represented by the Administrator of the National Aeronautics and Space Administration, Washington, D.C.

[21] Appl. No.: 672,294

[22] Filed: Jun. 28, 1996

[51] Int. Cl.[6] ............................................. G01H 17/00
[52] U.S. Cl. .................................... 73/590; 73/117.3
[58] Field of Search ........................ 73/579, 587, 590, 73/645, 649, 658, 432.1, DIG. 1, 117.3, 119 A; 60/39.06, 39.281, 39.27; 250/554; 123/688; 137/65; 364/431.11; 431/6, 16, 22

[56] References Cited

U.S. PATENT DOCUMENTS

| | | | |
|---|---|---|---|
| 3,824,391 | 7/1974 | Noltingk et al. | 250/208 |
| 3,895,901 | 7/1975 | Swartz | 431/77 |
| 4,508,501 | 4/1985 | Kühn | 431/2 |
| 4,602,507 | 7/1986 | Hayes | 73/117.3 |
| 4,915,613 | 4/1990 | Landis et al. | 431/6 |
| 5,426,971 | 6/1995 | Glidewell et al. | 73/19.05 |
| 5,499,538 | 3/1996 | Glidewell et al. | 73/119 A |

OTHER PUBLICATIONS

R. L. Puster et al, "Tops Suport Package For The Acoustic Flame-Out Detector"; Technology Applications Group, NASA Langley Research Center, Hampton, VA, Jun. 30, 1995.

S. E. Borg et al. "An optical flameout detection system for NASA Langley's 8-foot high temperature tunnel"; *Instru. Soc. Am.*, 1993.

*Primary Examiner*—Hezron E. Williams
*Assistant Examiner*—Rose M. Miller
*Attorney, Agent, or Firm*—Kimberly A. Chasteem

[57] ABSTRACT

An acoustic flame-out detection system that renders a large high pressure combustor 12 (FIG. 1) safe in the event of a flame-out and possible explosive reignition. A dynamic pressure transducer 22 is placed in the fuel line 16 and detects the stabilizing fuel pressure oscillations, caused by the combustion process. An electric circuit (FIG. 5) converts the signal from the combustion vortices, and transmitted to the fuel flow, to a series of pulses. A missing pulse detector 39 counts the pulses and continuously resets itself. If three consecutive pulses are missing, the circuit closes the fuel valve 20. With fuel denied, the combustor 12 is shut down or restarted under controlled conditions.

17 Claims, 6 Drawing Sheets

FUEL LINE BASED ACOUSTIC FLAME-OUT DETECTION SYSTEM

ORIGIN OF THE INVENTION

The invention described herein was made by employees of the United States Government and may be used by or for the Government for governmental purposes without the payment of any royalties thereon or therefor.

FIELD OF THE INVENTION

This invention relates generally to flame-out detection and relates specifically to a fuel line based acoustic flame-out detection system.

BACKGROUND OF THE INVENTION

Combustion chambers and reactors are used in chemical product production, aircraft, and rocket engines. Usually, such devices as furnace boilers are an integral part of everyday life, and am taken for granted to work safely to supply heat, power, and propulsion. Sometimes these devices fail as a result of rapid uncontrolled combustion or reaction, resulting in serious consequences for the operating system.

Gaseous fuels such as methane, ethane, propane, and the like, produce deflagrations with pressures about 3 to 5 times the mean combustion pressure. Solid fuels, such as coal dust, wood particles, wood flour, and other solid organic fuels, will produce over pressures of 5 to 6.7 above mean (usually one atmosphere) combustion pressure. Some fuels, such as hydrogen and acetylene, may detonate and produce over pressures of 20 above the normal combustion pressure. Common industrial fuels, such as water gas, coke oven gas, and the like, with high amounts of hydrogen and carbon monoxide may detonate and produce high over pressures of more than 10. Some liquid fuels, such as gasoline and fine mists of kerosene, readily deflagrate and produce over pressures of more than 3. Also, obstructions and complexity may promote a deflagration to a detonation transition (DDT) where extremely high over pressures are possible. Relatively benign fuels, in the presence of added oxygen, may exhibit a tendency to form a DDT. The possible DDT is usually not possible to be incorporated into the design since the pressure vessel would make the combustion chamber too expensive to be practical.

Rocket engine flame-out and re-ignition can be very fast, with the possible structural failure of the engine. When flame-out is experienced in an aircraft engine, the aircraft loses altitude rapidly and may crash if flame-out occurs close to the ground, on takeoff, or in a climb over a mountain range. Flame-out of one engine of a two-engine aircraft can cause uncontrollable yaw, and roll, leading to a crash and loss of the aircraft.

In the home, the gas furnace may not have been properly cleaned and the center flame holders work fine permitting the furnace to be started, but the side flame holders may be partially clogged. If satisfied, the thermocouple used to monitor the pilot flame indicates sufficient emf to permit the main gas valve to open and allows full gas delivery. After some short period of time, the flue will fill with unburned gas, and may ignite. If the furnace is propane or LPG, the possible explosion may seriously damage or destroy the house.

In the chemical process industry, an explosion from a reaction interruption and uncontrolled process restart, can result in equipment loss. In each of these, and other scenarios, the consequences of a flame-out in a reaction chamber or combustor can progress to an explosion.

In some cases described, the explosion may be mild, with weak subsonic deflagration, and simply be accompanied by some noise and possibly some smoke. In other situations, the results can be more serious where the deflagration to a detonation transition (DDT) occurs, due to extremely high over pressures. Mild explosions may damage only the combustor where the events are simple deflagrations resulting from the combustion waves moving through the combustible mixture at subsonic (weak deflagration) to sonic speeds (strong deflagration). Usually for a strong deflagration, the pressure increase is about 3 to 5 times the operating pressure.

In other cases, the event may destroy, not only the combustor or reactor but, the entire vehicle and/or factory/industrial complex, as well. These events are usually detonations, where the combustion wave proceeds at supersonic speeds up to about Mach 4 to 6, and the pressure increases by a factor of 20 or more.

These problems may be eliminated, or at least minimized, by detecting the flame-out quickly and closing the fuel valve and possibly restarting the engine or process only in a predetermined and controlled fashion.

The science of flame-out detection or flame establishment was created years ago and a number of systems have been developed to detect flame-outs and stop fuel supply to combustion chambers prior to possible deflagrations becoming detonations. Currently available flame-out detectors are too slow for rocket chambers and high pressure reactors and/or are difficult to install. Also, the available flame-out detectors lack reliable quick detection capabilities. Fast speed, 20 to 200 ms (milliseconds), and very high reliability are needed for use in gas turbines of aircraft.

Most commercial flame-out detectors are slow (about 1.0 second or longer) and are not completely reliable, or the detectors only sample a small part of the reacting volume. In some prior art systems, quickness of detection may be achieved but reliability is poor and false indications are frequent. The prior art flame-out detectors include (1) the use of one or more thermocouples immersed in the flame; (2) ultraviolet (UV) detectors to "stare" at the flame; (3) photo multipliers (PM) to "stare" at the flame; (4) photodiodes to "stare" at the flame; infrared detectors (IR) to "stare" at the flame; (6) acoustic detector (combustor housed) based on a standing wave at 30 Hz; and (7) fiber optic detector by Borg.

The disadvantages in all of these systems is that they, (or the sensing optical fiber) have to be located inside the combustor. The environment inside the combustor is very hostile and, for accuracy, the detector must be located in a cool region or be cooled. Additionally, the noise and vibration level in combustors is very high and may cause premature failure of even the best device.

The thermocouple is slow, typically as slow as 0.20 seconds, with total response time of 1 to 2 seconds. If the temperature is above 3400° F., the only thermocouple available is Iridium-Rhodium which has serious hysteresis problems. If the temperature is above 4000° F., then thermocouple use is not possible. Rocket combustors operate at temperatures of 5000° F. to over 6000° F.

UV detectors and their associated circuits are slow, with typical response time to close or activate being 1 to 4 seconds. This makes their use in high flow and high pressure combustors almost useless.

PM tubes are sensitive to vibration and heat. Thus, these detectors must be used with fiber optics. The high sensitivity may also be a problem since some flames at high pressure are so bright that filters must be used. The flame-out may be at a low light level such that the PM with a filter could not detect the event. The speed of the PM may be a problem since flame-out is not an instantaneous process. The flame may be out in some regions of the combustor but still reacting in others, thus, the aiming area or volume is critical to the use of the PM.

The silicon photo diode is rugged and not so sensitive as the PM, but the aiming and small view angle is still a problem. Another problem is that, in a large combustor, a flame-out may have occurred but it takes considerable time for the hot combustion products to leave the combustor, e.g. 300–500 milliseconds. Thus, the aiming area or volume is critical.

The IR detectors are attractive but the same problem of decaying combustion and time to leave the chamber slow the response. Hot combustor walls may also be a problem since they will continue to give a strong signal long after the cessation of combustion.

The acoustic detector currently used in the large combustor of the NASA Langley 8-Foot High Temperature Tunnel (HTT) is reasonably fast and gives no false indications of flame-out. However, for good response, the pressure sensor must be located within the combustor itself. Any changes in the hostile environment within the combustor affects the accuracy and reliability of any sensor element located therein. An additional problem arises when a damping plate and resonator are added to the combustor wherein the noise levels decreased dramatically, and the 30 Hz was eliminated. Thus, the simple standing wave type approach needs to be improved to make the technique universal, and it would be desirable to have the detector outside the combustor in a benign location that is readily reached and easy to use. This example is specific but the logic is universal.

The fiber optic detector by Borg (S. E. Borg et al, "An Optical Flameout Detection System for NASA Langley's 8-Foot High Temperature Tunnel"; May 1993; *Instrument Society of America*), is reasonably fast but the fiber optic must be inside the combustor and look through the fuel injector at the correct location for accurate functioning. Also, the optics must be kept clean. If the fuel injector is changed or if the optics are dirty, the unit will not function.

There is, thus, a definite need in the art for a quick, reliable, easy to install, flame-out detector system.

SUMMARY OF THE INVENTION

It is therefore an object of the present invention to provide a fast, reliable and easy to install flame-out detector system for combustion chambers and reactors.

Another object of the present invention is a flame-out detection system that does not interfere with the operation of the combustor.

An additional object of the present invention is a sensitive flame-out detection system that eliminates or minimizes false indications of flame-out.

A further object of the present invention is a flame-out detection system that gives a reliable signal to close a fuel valve if a combustor experiences a flame-out during operation.

Another object of the present invention is a flame-out detector that may be mounted in a non-hostile environment exterior of the combustor.

A still further object of the present invention is an acoustically responsive flame-out detector system that responds to acoustic signals in the fuel supply line of a combustor to indicate a flame-out and facilitate shutting off the fuel supply.

According to the present invention, the foregoing and additional objects are attained by providing an acoustic sensor gage (a dynamic pressure transducer) secured within, or adjacent to, the fuel line leading into a combustor unit. The acoustic sensor detects the harmonic vortices caused by oscillation pressures of the flame, and transferred to the fuel flow within the fuel line by the combustor process.

The technique of finding a signal in the fuel line related to combustion may be found by:
(1) Simple observation that the signal is only present when combustion is occurring. The frequency may then be found by a linear spectra;
(2) By using a gage in the combustor near the fuel injector and another gage in the fuel line, the signal from the two can be cross correlated to find a frequency common to both;
(3) The fuel line may have resonant frequencies that may be excited by the combustion process. These frequencies may be calculated and the signal from the gage in the fuel line analyzed for the presence of these resonant frequencies; and,
(4) A high order harmonic of an instability frequency may be present in the fuel line. This will usually be very strong, but the combustor designers may want to eliminate the instability harmonic. Since heat release and pressure oscillation are cause and effect, and strongly related, there will always be some frequency present that is suitable for use as a signal for flame-out detection.

After determining the frequency to be utilized, the acoustic sensor gage of the present invention is positioned exterior of, but as close as reasonably possible to, the combustion process.

The acoustic signal received by the sensor gage is converted from millivolts (mv) to volts (v) by a signal conditioner before being received by an input buffer amplifier in the flame-out detector circuit. For the specific combustor described, the following specifics apply. From here the signal is routed to a two pole active bandpass filter with a center frequency of 1000 Hz, a lower cutoff at 950 Hz and a upper cutoff at 1050 Hz. The resulting wave of 1.0 ms, peak to peak, is next routed to a precision full wave rectifier such that the output peaks are at 0.5 ms and positive.

The waves are now analyzed by a comparator wherein only waves above a preset voltage (4.5 mv) are allowed to pass. The comparator produces a series of rectangular wave pulses with 0.5 ms between pulses.

A Missing Pulse Detector (MPD) is set to 1.5 ms (three pulses) such that if 3 or more pulses are missing, then a signal is sent to the output buffer/relay to close the fuel valve. To avoid false triggers by the MPD, an internal time is set each time a pulse is received but, if no pulses are received during a period of time equal to 3 pulse periods, a trigger signal at 3 times the pulse period plus 3 ms is provided. This scheme was adopted to prevent false trigger. A Programmable Logic Controller (PLC) initiates a Normal Stop which closes the fuel valve.

The total time required for fuel cut-off is obtained as follows: The flame decay takes about 10 ms. The electronics requires about 1.1 to 2.0 ms (estimated), the MPD requires 1.5 ms, with the sum of these times being 13.5 ms, as compared to 120 ms for the standing wave detector at 30 Hz of the prior art acoustic detector system. A speed increase of 9 over the prior art acoustic system is thus realized. The actual time may be slightly faster since 10 ms for flame decay is high.

If the vortical structures are at 1000 HZ; they will persist for 6 times the inverse of the frequency or 6 ms. The total time could be as low as 6+1.1+1.5=8.6 ms as compared to 120 ms for the 30 HZ standing wave system employed with the pressure transducer located within the combustor chamber. This translates to a speed increase of 14 and makes the present invention 112 to 140 times faster than any known flame-out detector system.

BRIEF DESCRIPTION OF THE DRAWINGS

A more complete appreciation of the invention and many of the attendant advantages thereof will be readily apparent as the same becomes better understood in reference to the accompanying drawings, wherein.

DETAILED DESCRIPTION

Figure 1:
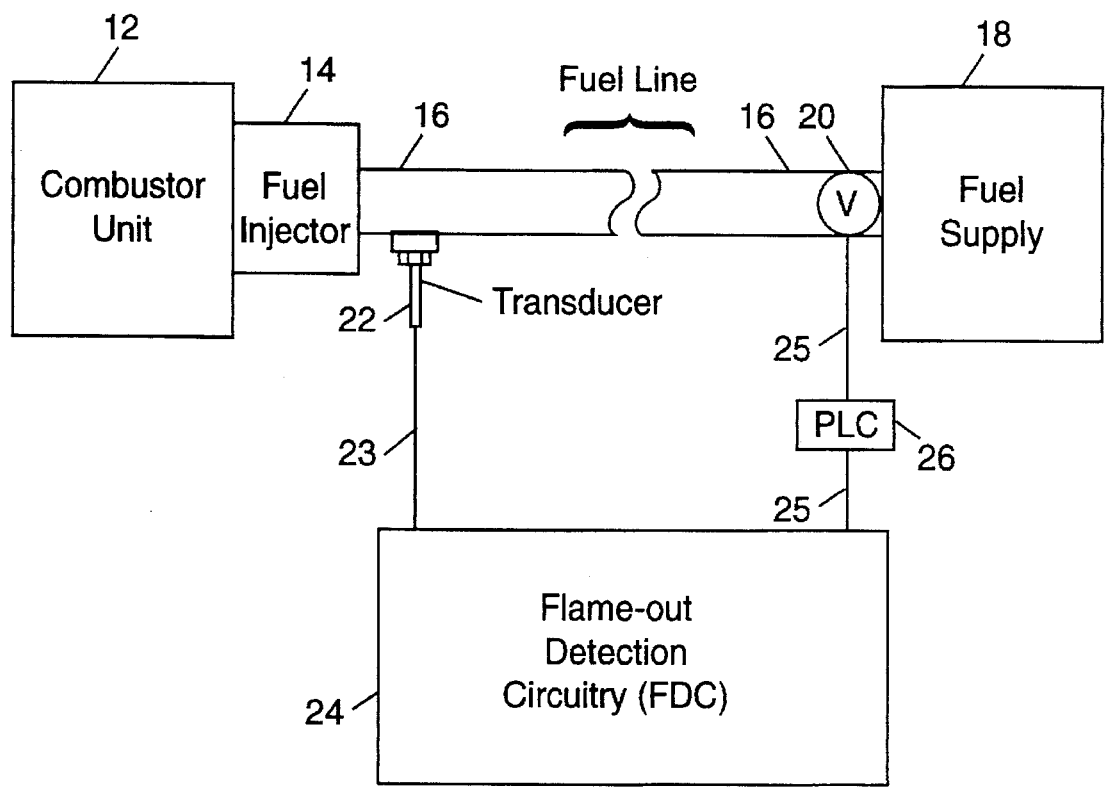
FIG. 1 is a schematic representation of the preferred embodiment of acoustic flame-out detection system of the present invention with the transducer sensor gage extending through a port located in the fuel line adjacent the fuel injector and combustor unit.

Referring now to the drawings, FIG. 1 schematically illustrates the flame-out system 10 of the present invention as employed with an exemplary combustor unit 12. A fuel injector 14 supplies fuel to combustor unit 12 through a fuel line 16 leading from a fuel supply 18. An electronically actuated valve 20 controls the flow from fuel supply 18 into fuel line 16. When valve 20 is closed, no more fuel can exit fuel supply 18 into fuel line 16, and combustor unit 12 is safely inactivated. During normal operation of combustor unit 12, the flow of fuel through fuel line 16 is essentially stabilized and the frequency of oscillation pressure in fuel line 16 is also stabilized. The frequency of oscillation pressure is a measurable quantity and is detected by a dynamic pressure transducer gage 22. In the preferred embodiment of the invention, pressure transducer gage 22 is positioned through a port in the sidewall of fuel line 16, and as close to fuel injector 14 and combustor unit 12 as practical, as will be further explained hereinafter.

The output from pressure transducer gage 22 is fed (via line 23) to flame-out detection circuitry (FDC) 24 via line 23. When the pressure measurements received by flame-out detection circuitry 24 are reduced to a predetermined level, circuitry 24 trigger (line 25) the operation of a Programmable Logic Controller 26 (PLC), a computer system, to effect closure of fuel valve 20. Upon closure of valve 20, fuel flow through fuel line 16 ceases and the combustor unit 12 is safely inactivated pending controlled re-ignition thereof.

Figure 2:
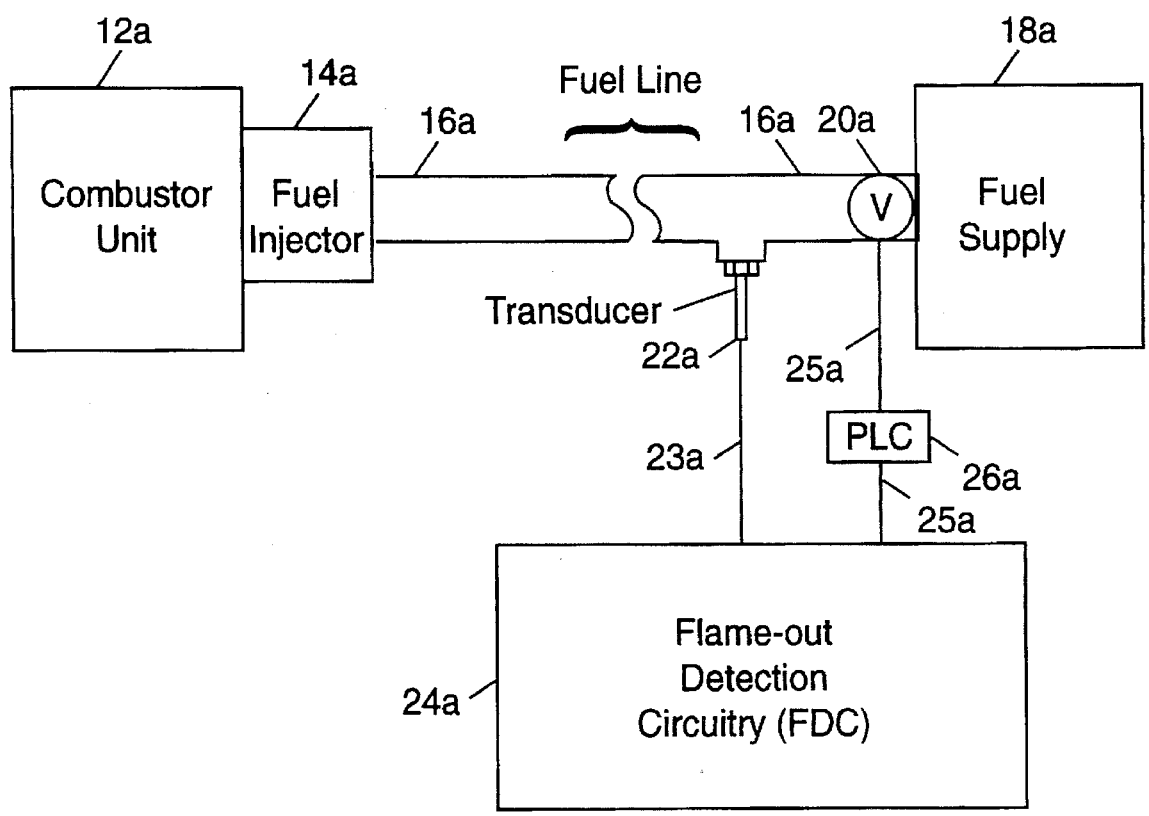
FIG. 2 is a schematic partial view of the flame-out detection system shown in FIG. 1 with the transducer sensing gage therefor being spaced upstream from the fuel injector and combustor unit.

Referring now more particularly to FIG. 2, the schematic partial view of a modification of the flame-out system 10a is shown. The parts of this system are identical to that described hereinbefore in reference to the embodiment of FIG. 1, with the exception that the pressure transducer sensor gage 22a is located in the fuel line 16a a distance upstream from the injector 14a and combustor unit 12a. The location of the transducer sensor 22a further away from the injector 14a and combustor unit 12a may be necessitated by interfering noise levels at or adjacent to the combustor 12a. Also, it is very attractive to locate the pressure sensor (22, 22a) outside of the combustor unit since no cooling or special mountings are needed. The operation of the embodiments of both FIG. 1 and FIG. 2 are the same, as will be further explained hereinafter.

Figure 3:
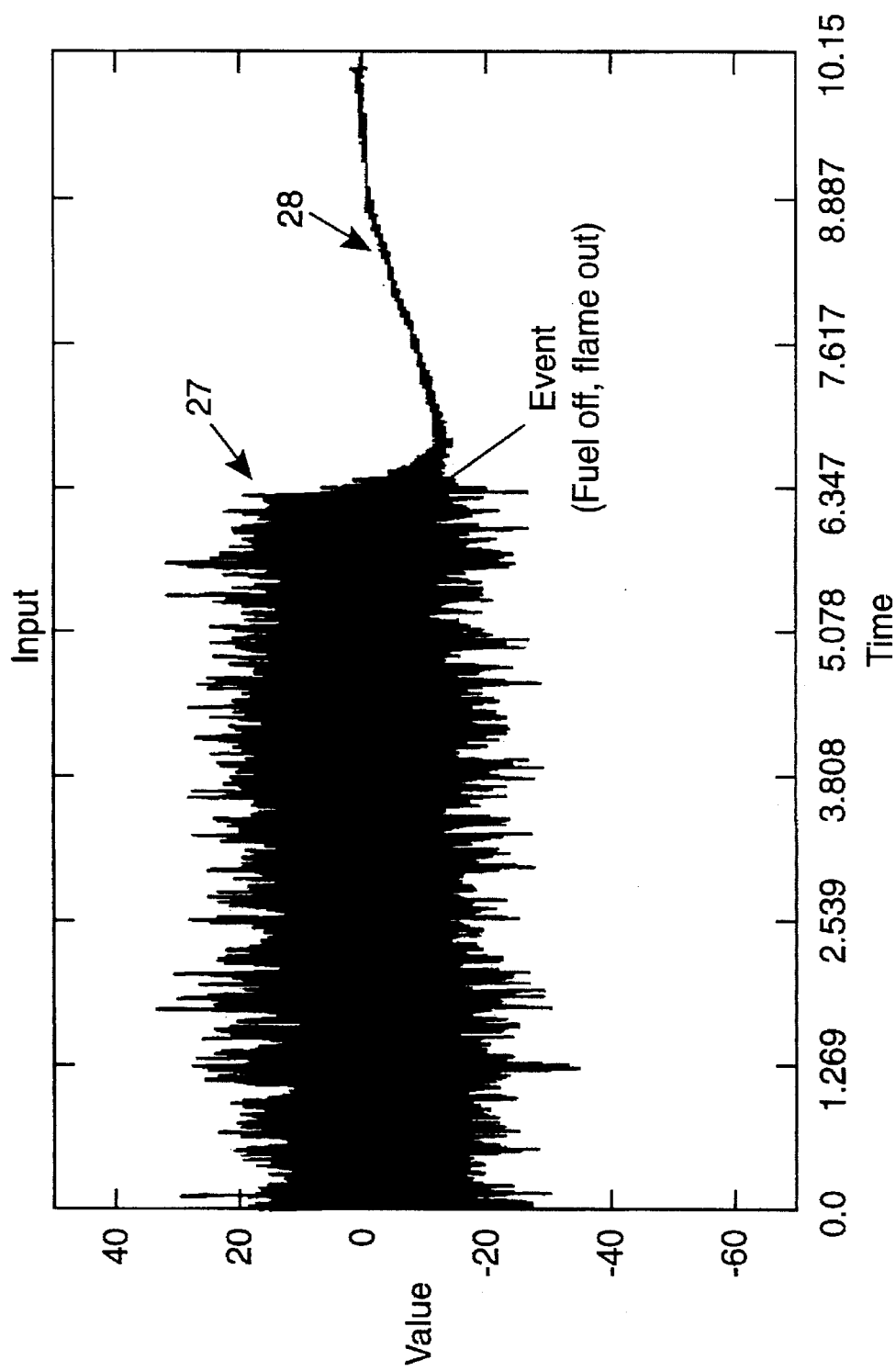
FIG. 3 is a schematic illustration of a specific fuel pressure signature during combustor operation and, at a flame-out or upon fuel shut-off that stops combustor operation.

Referring now to FIG. 3, a schematic, graphic view of the pressure oscillations 27 detected by the transducer pressure gage 22, disposed within the system as illustrated in FIGS. 1 and 2, during a specific combustor operation. As illustrated therein, upon flame-out or upon fuel shut-off, the signal from the transducer pressure sensor 22 no longer indicates rhythmic oscillations 27, but becomes essentially a straight line 28.

Figure 4:
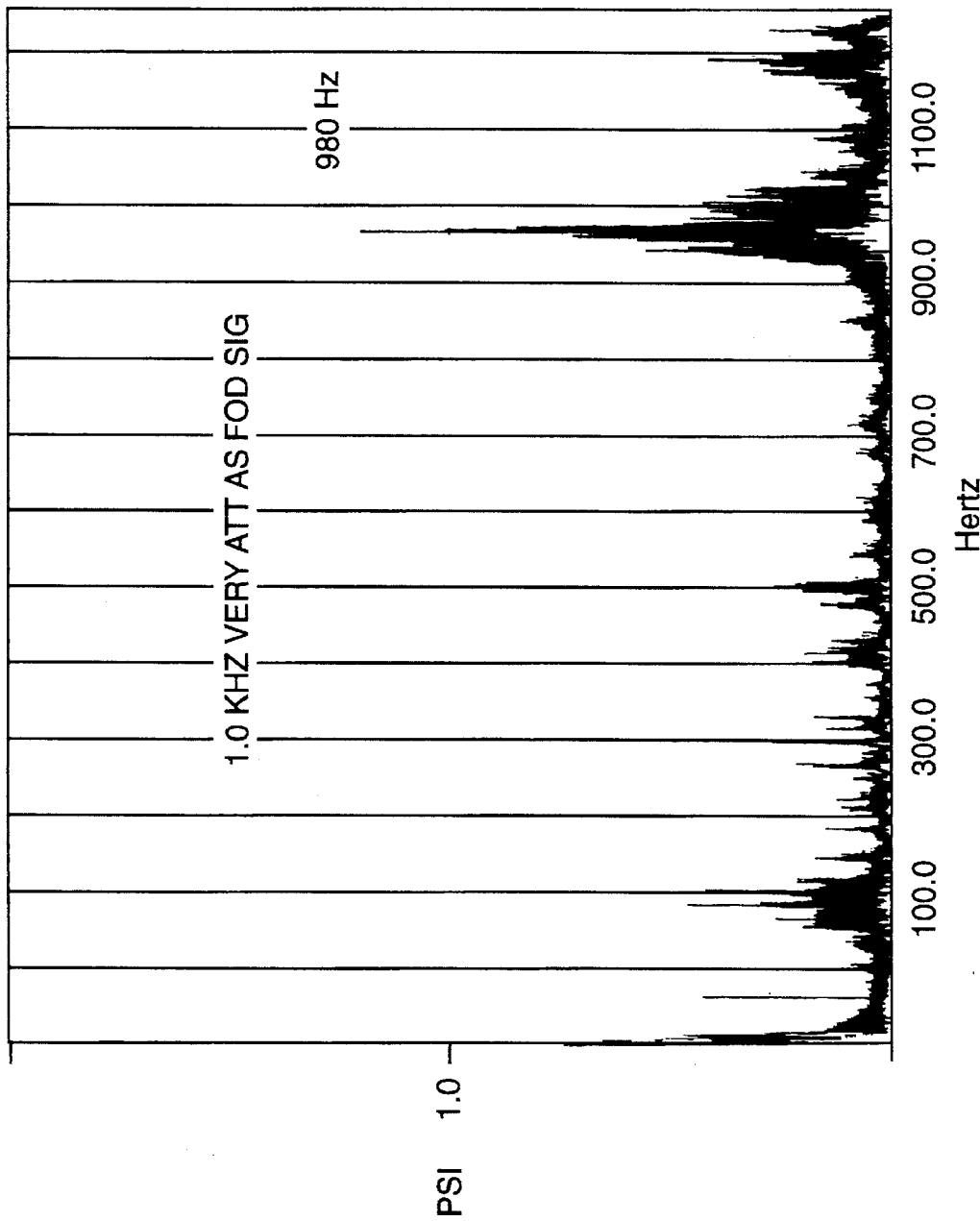
FIG. 4 is schematic illustration of the linear spectra frequency harmonics in a specific combustor fuel line showing that 980 Hz is very strong and the predominant frequency in the fuel pressure signature illustrated in FIG. 3 fuel line.

Referring to FIG. 4, the linear spectra of the frequency harmonics (illustrated in FIG. 3) in a specific combustor fuel line, shows that 980 HZ is very strong for the example combustor, and the predominant frequency in the fuel line, as detected by the present invention.

Figure 5:
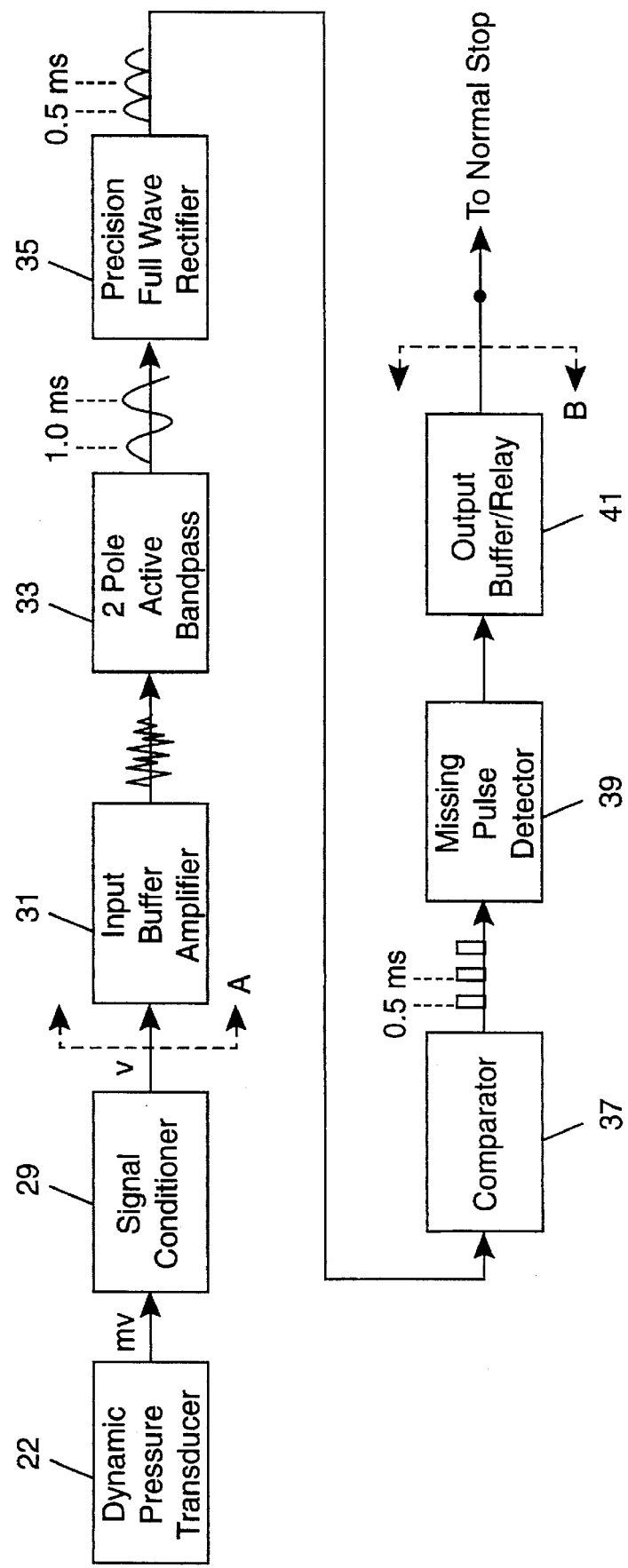
FIG. 5 is a schematic illustration of the component parts of the flame-out detector and circuitry of the present invention; and, FIG. 6 is an enlarged detailed view of part of the circuitry shown in FIG. 5.
Figure 6:
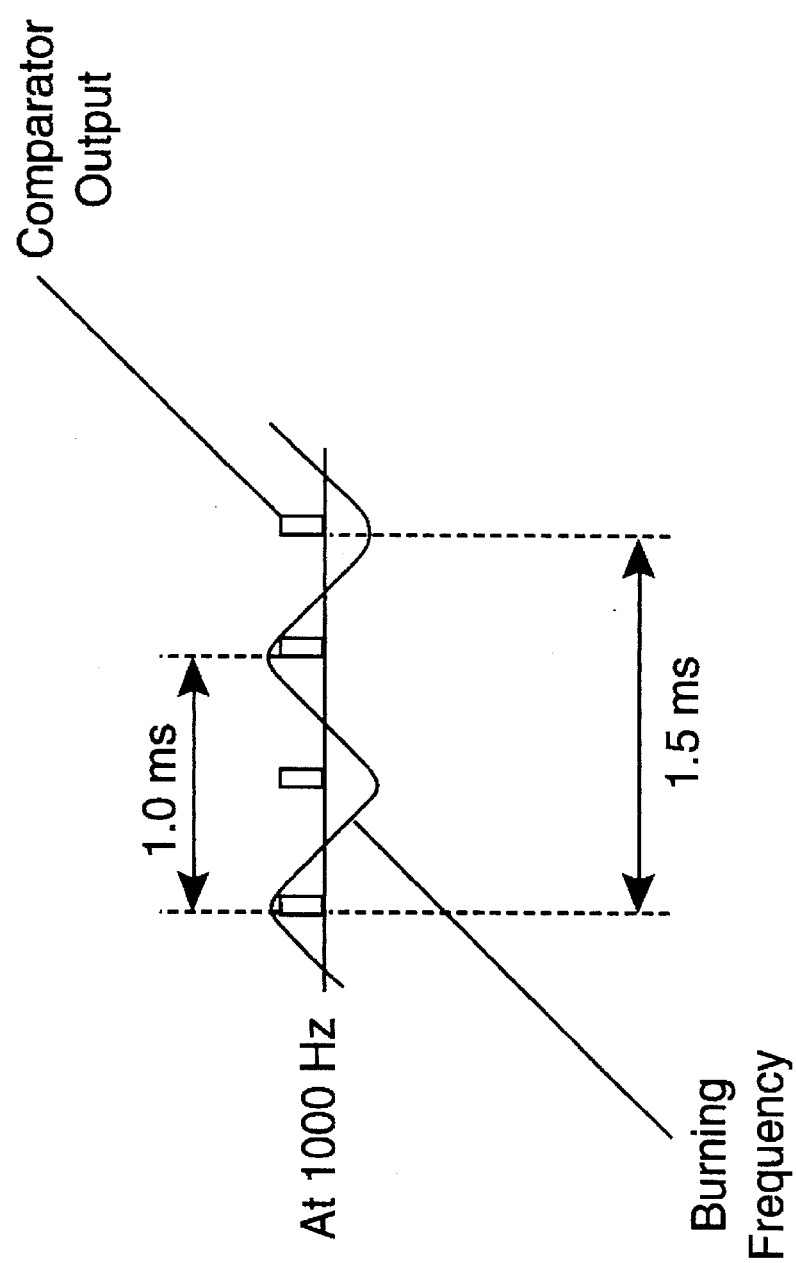

Referring now more particularly to FIGS. 5 and 6, the details of the component parts of the flame-out detector and circuitry of the present invention will now be described.

As illustrated in FIG. 1, and discussed hereinbefore, the dynamic pressure transducer 22 is located within fuel line 16 and transmits the frequency oscillation pressures from the fuel flow, and caused by the combustion process, as a millivolt level signal. This millivolt level signal is received by a Signal Conditioner 29 where it is increased to volts and transmitted to, and amplified by, an Input Buffer Amplifier 31 within the Flame-out Detector Circuit (indicated as being disposed between brackets A and B). The amplified signal includes the pressure frequency oscillations of the fuel pressure plus the critical noise caused by the combustor operation.

A Two Pole Active Bandpass Filter 33 receives the signal from Amplifier 31 and separates the desired signal input (combustion process signal) from the background noise contaminants. For the example combustor, the Bandpass Filter 33 is set at a frequency of 1000 Hz, with a lower limit of 950 Hz and an upper limit of 1050 Hz, and transmits only frequencies within these limits. These limits are established by the combustor characteristics in a specific combustor system, and are acoustically transmitted as pressure oscillations by the fuel flow.

As illustrated, the signal transmitted from Bandpass Filter 33 has sinusoidal peaks appearing at 1.0 ms intervals and is received by a Precision Full Wave Rectifier 35. After processing by the Full Wave Rectifier 35, the rectified peaks are now all positive and at 0.5 ms from peak to peak.

The rectified signal peaks are conveyed to a Comparator 37 that is set to pass only those pulses above a preset sensitivity level. In this specific example of the present invention, Comparator 37 is set to pass only pulses above 4.5 mv. (FIG. 6 shows an enlarged detail of the output of Comparator 37.) The pulse train is now a rectangular wave with 0.5 ms between pulses, and is received by a Missing Pulse Detector 39. The Missing Pulse Detector 39 is set to 1.5 ms such that if three or more consecutive pulses are missing, then a signal is sent to the Output Buffed/Relay 41 to effect a Normal Stop by closing the fuel valve 20 (FIG. 1). A Programmable Logic Controller (PLC) 26 initiates the Normal Stop.

Output Buffer/Relay 41 is normally open when no power is applied thereto. When installed in Flame-out Detector Circuit AB, as schematically shown in FIG. 5, the circuit supplies power to close the relay 41 until it receives missing pulse information from MPD 39. At that time, power is removed from the relay. Thus, the relay circuit is closed until there is indication of a flame-out, at which time power to the relay is removed and the relay goes to its unpowered or normally open position. The circuit was constructed in this manner for "fail-safe" reasons. When the circuit loses power, the relay will open. If power is lost (for reasons other than a flame-out) and there is a flame-out, the circuit would not function and danger would arise. Thus, any loss of power is read or interpreted as a flame-out and the combustor is shut down until electrical power is restored to the flame-out detector circuit AB.

The operational speed of the time from a flame-out detection, using the fuel line mounted sensor of the present invention, until closure of valve 20 or shut-down, is approximately forty times as fast as a previous acoustic system wherein a dynamic pressure transducer was employed within the combustor unit.

The total time required is obtained as follows: The flame decay upon flame-out takes about 10 ms and the electronics require about 1.1 to 2.0 ms (estimated). The Missing Pulse Detector (MPD) 39 requires 1.5 ms, with the sum of these times being 13.5 ms. This is a substantial improvement over the 120 ms achieved for the standing wave at 30 HZ as in the system employing the dynamic pressure transducer within the combustor unit. A speed increase of nine is thus realized.

The actual time may be slightly faster since the 10 ms estimated for flame decay may be high. If the vortical structures are at 1000 Hz, they will persist for six times the inverse of the frequency, or for 6 ms. The total time could be as low as 6+1.1+1.5=8.6 ms as compared to 120 ms for the 30 Hz standing wave. This translates to a speed increase of 14 and makes the present invention 112 to 140 times faster than any known flame-out detector system.

The time required for the fuel valve 20 of the example combustor to close is about 40 ms. Thus, the fuel supply could be cut off in 48.6 ms after the first indication of a flame-out. The quantity of fuel delivered in this time interval is trivial and no explosion is possible for this lean mixture. The standing goal of 400 ms for closure for the example combustor, as determined as the maximum time permitted for safely shutting off the fuel after a flame-out in the Eight Foot Hypersonic Test Tunnel (HTT) at NASA Langley Research Center, is greatly exceeded. The present invention gives a factor of 8 over the time needed to reach any possible flammable mixture, while preserving all the other desirable features such as reliability and safety in operation.

Although the invention has been described relative to embodiments configured to detect the absence of vortical sound at 1.0 KHz, and specifically intended for use in elimination of the hazard associated with a flame-out and uncontrolled re-ignition of methane and oxygen at pressures up to 136 atmospheres, in the combustor unit of the Eight Foot HTT facility at NASA Langley Research Center, it is not so limited. The invention is not restricted to use at the frequencies described herein but may be adapted to use with any frequency by changing the sensitivity of the sensing and other components therein to thereby render the Use of the invention more universal. Thus, the present invention may be employed for the detection of the absence or change in any process where steady noise frequencies are present.

For example, in a sawmill operation the saw ordinarily runs at a fixed speed and generates a characteristic tone, If some of the teeth are missing or broken, then the frequency will change. By use of the present invention to detect the normal tone of the saw blade, and monitoring any change in this tone due to a frequency shift and loss of the old tone, a signal can be generated to indicate the need for shut-down, or repair, of the sawmill.

Similarly, bearings for high speed rotating equipment have a characteristic tone, faint; but present. If the bearing becomes damaged, the frequency will change to a lower tone and the system of the present invention could detect and shut down the machinery before serious damage has occurred.

In industrial chemical and manufacturing processes, the pressure variations of fluid through a line has a characteristic tone for a particular flow rate and temperature of the fluid. If this tone were to be changed by having too much or too little fluid, then the process could produce an undesirable result. The loss of the expected or programmed tone could be signaled to operators or to a microprocessor, by use of the present invention, for corrective action.

Some pumps, such as those used for lubrication or cooling are critical. When the pump fails, the machine may be greatly damaged requiring expensive repairs. If the pump operates at constant speed, it will have a characteristic tone, and as it begins to fail, that tone will change. The present invention could be employed to monitor such pump operations to detect the start of the failure long before complete pump failure and provide a shutdown signal. Thus, only the pump would have to be repaired, as opposed to the complete machine.

The flame-out of an aircraft combustor is a serious event, especially if occurring at low altitude. The present invention could be employed to detect a flame-out in an aircraft combustor and initiate an emergency restart. This could be done in about 50 ms and would greatly increase the safety of landing and takeoff of jet aircraft.

These, and many other uses of the present invention, will be apparent to those skilled in the art in the light of the above teachings.

No specific components have been specified for constructing of the present invention. Most of the components employed are available from a number of electronic manufacturers. For example, various conventional acoustic transducers, usually powered by a 5 or 10 volt DC source such as a battery or high quality power supply, are suitable for use with the present invention. These transducers may be positioned completely within the fuel line or in communication with the fuel line, as illustrated in the embodiments disclosed herein. Most manufacturers of the acoustic transducers make cooling jackets for the transducer, if needed.

In a specific embodiment of the present invention, transducer 22 was a P. C. B. part Number H113A26, and operable from 0–500 psi. The signal conditioner was a P. C. B. part number 483B07. These parts were procured from PCB Piezotronics Inc., 3425 Walden Avenue, Depew, N.Y. 14043-2495. A suitable spectrum analyzer (available from either Hewlett-Packard, B & K, or General Radio) may be employed for measurement of the spectrum.

Specific details of the measurements of the signal level in psi and volts or millivolts are omitted herein in the interest of brevity. These details are incorporated in the published "TOPS SUPPORT PACKAGE FOR THE ACOUSTIC FLAME-OUT DETECTOR", authored by the inventors and incorporated herein by reference. Copies of this publication are available from the TECHNOLOGY APPLICATIONS GROUP, NASA Langley Research Center, Hampton, Va. 23681.

There are numerous variations and modifications of the present invention that will be readily apparent to those skilled in the art in the light of the above teachings. It is therefore to be understood that, within the scope of the appended claims, the invention may be practiced other than as specifically described herein.

What is claimed as new and desired to be secured by Letters Patent of the United States is:

1. In combination, a flame producing structure and a flame-out detection electronic circuit for shutting off fuel to the flame producing structure for safely stopping the operation thereof, comprising:
   a combustor unit for said flame producing structure,
   a fuel supply providing fuel for said combustor unit;
   a fuel line connecting said fuel supply to said combustor unit;
   valve means within said fuel line for controlling the flow of fuel from said fuel supply to said combustor unit;
   a fuel injector receiving fuel from said fuel line for transmission to said combustor unit;
   sensing means connected to said fuel line for detecting pressure oscillations produced in said fuel line during operation of said combustor unit;
   electronic circuit means receiving signals from said sensing means;
   said electronic circuit means being responsive to changes in pressure detected by said sensing means due to changes in the fuel pressure oscillations within said fuel line caused by combustor flame-out, to effect shut-off of fuel from said fuel supply and provide a safe shut down of combustor operation.

2. The combination of claim 1 wherein said sensing means comprises a dynamic pressure transducer;
   said dynamic pressure transducer being connected to said fuel line and serving to detect pressure oscillations produced by the combustion process through said fuel line and output a signal representing these changes in terms of millivolts; and
   signal conditioner means receiving the signal from said dynamic pressure transducer and converting the signal received into volts.

3. The combination of claim 2 wherein said electronic circuit means includes an input buffer amplifier;
   said input buffer amplifier serving to amplify and produce the voltage signal from said signal conditioner means and produce a sine wave indication of the fuel pressure oscillations signal plus background noise produced during combustion of fuel;
   an active bandpass filter receiving and filtering the sine wave from said input buffer amplifier and filter removing the background noise therefrom; and
   said active bandpass filter transmitting the filtered signal as a smooth sinusoidal wave.

4. The combination of claim 3 wherein the pressure oscillations produced by combustion pressure oscillations transmitted through said fuel line have a predominant frequency of approximately 1000 Hz, and said active bandpass filter is a two pole active bandpass filter set at a frequency of 1000 HZ, with an upper limit of 1050 Hz and a lower limit of 950 Hz, and transmits only frequencies within these limits.

5. The combination of claim 3 including a full wave rectifier receiving the smooth sinusoidal wave signal from said bandpass filter and converting the sinusoidal wave signal to an all positive, half-amplitude, smooth peak wave.

6. The combination of claim 5 including a comparator means receiving the positive, half amplitude, smooth peak signal; said comparator means serving to pass all positive, half-amplitude, smooth peak signals that exceed a predetermined voltage as rectangular wave pulses.

7. The combination of claim 6 including a missing pulse detector receiving and counting the rectangular wave pulses from the comparator means over a predetermined time frame and, serving to emit an electrical signal if a predetermined number of consecutive pulses are missing during the predetermined time frame.

8. The combination of claim 7, including an output buffer/relay means for receiving the electric signal emitted by said missing pulse detector, said output buffer/relay means being in an operative closed contact closure mode during normal operation of said combustor unit and, upon receiving the missing pulse signal from said missing pulse detector unit, reverting to an inoperative open contact mode.

9. The combination of claim 8 including a programmable logic controller connected to said output buffer/relay and, wherein when said output buffer/relay reverts to the inoperative open contact mode, said programmable logic controller effects closure of said valve means and stops all fuel flow from said fuel supply to said combustor unit.

10. The combination of claim 1 wherein said sensing means is a dynamic pressure transducer, said dynamic pressure transducer being disposed within a port in the sidewall of said fuel line.

11. The combination of claim 10 wherein said port in the sidewall of said fuel line is located adjacent to said fuel injector.

12. The combination of claim 10 wherein said port in the sidewall of said fuel line is located at a spaced distance upstream from said fuel injector.

13. In combination, a fuel fed flame producing structure and a flame-out detection system to detect flame-out conditions and stop fuel flow to the flame producing structure, comprising:
   a flame producing structure having a combustor unit, a fuel supply, a fuel injector for said combustor unit, and a fuel line leading from said fuel supply to said fuel injector to supply fuel to said combustor unit;
   detection means for detecting pressure oscillations produced by the combustion process and acoustically transmitted through said fuel line during operation of said combustor unit;
   said detection means producing an electric signal in terms of millivolts;
   signal conditioner means receiving the signal from said detection means and converting the signal from millivolts to volts;
   an input buffer amplifier receiving and amplifying the voltage signal from the combustion process, plus background noise caused by the fuel flow, and other sources of noise, as received from said signal conditioner;
   said input buffer amplifier serving to produce a sine wave of the combustion process signal and background noise contained therein;
   bandpass filter means receiving the amplified sine wave signal from said input buffer and separating the desired signal input from any background noise contained within the amplified signal;

said bandpass filter means transmitting a smooth peak signal of the combustion process signal at a predetermined wave length;

rectifier means receiving the smooth peak signal from said bandpass filter and converting the signal to a specific positive pulse signal;

comparator means receiving the rectified signal peaks;

said comparator means being programmed to pass only pulses above a predetermined voltage and in the form of rectangular wave pulses;

a missing pulse detector receiving the rectangular wave pulses from said comparator means;

said missing pulse detector serving to count pulses as received from said comparator means and, upon the absence of a predetermined number of consecutive pulses, to emit an electronic signal;

an output buffer relay in connection with said missing pulse detector and serving to receive any electronic signal from said missing pulse detector;

said output buffer relay being normally in an operative closed contact mode during a flame-on condition for said combustor unit and, upon receipt of the electronic signal from said missing pulse detector, reverting to an inoperative open contact mode and initiate closing of said fuel valve to shut-off fuel flow to said combustor and provide a normal stop for combustor operation.

14. The combination of claim 13 wherein said detection means comprises a dynamic pressure transducer, said dynamic pressure transducer being disposed within a port in the sidewall of said fuel line.

15. The combination of claim 14 wherein said port in the sidewall of said fuel line is located adjacent to said fuel injector.

16. The combination of claim 14 wherein said port in the sidewall of said fuel line is located at a spaced distance from said fuel injector.

17. The combination of claim 13 wherein the pressure oscillations produced by the combustion process through said fuel line have a predominant frequency of approximately 1000 Hz, and said bandpass filter means comprises a two pole active bandpass filter set at a frequency of 1000 Hz, with an upper limit of 1050 Hz and a lower limit of 950 Hz, and filters out all frequencies not within these limits.

* * * * *